US012790013B2

(12) United States Patent
Lotan et al.

(10) Patent No.: US 12,790,013 B2
(45) Date of Patent: Nov. 10, 2026

(54) AIR INTAKE MODULE FOR A PROJECTILE

(71) Applicant: ISRAEL AEROSPACE INDUSTRIES LTD., Lod (IL)

(72) Inventors: Asher Lotan, Lod (IL); Shay Mordechai, Lod (IL); Avner Sirota, Lod (IL); Israel Weissbuch, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 18/875,873

(22) PCT Filed: Jun. 27, 2023

(86) PCT No.: PCT/IL2023/050660

§ 371 (c)(1),
(2) Date: Dec. 17, 2024

(87) PCT Pub. No.: WO2024/003902

PCT Pub. Date: Jan. 4, 2024

(65) Prior Publication Data

US 2025/0368343 A1 Dec. 4, 2025

(30) Foreign Application Priority Data

Jun. 29, 2022 (IL) .......................................... 294415

(51) Int. Cl.
*B64D 33/02* (2006.01)
*F42B 10/14* (2006.01)

(52) U.S. Cl.
CPC .............. *B64D 33/02* (2013.01); *F42B 10/14* (2013.01)

(58) Field of Classification Search
CPC .......... B64D 33/02; F42B 10/14; F42B 15/10; F42B 15/01; F42B 15/00; F02C 7/04; F02C 7/042
See application file for complete search history.

(56) References Cited

U.S. PATENT DOCUMENTS 3,495,605 A * 2/1970 Gunnarson ............. F02C 7/042 137/15.1
3,976,088 A * 8/1976 Karanian ................ F02C 7/042 137/15.1

(Continued)

FOREIGN PATENT DOCUMENTS

CN 108955423 A * 12/2018 ............. F42B 15/00
FR 1480297 A 5/1967

*Primary Examiner* — Assres H Woldemaryam
(74) *Attorney, Agent, or Firm* — Ballard Spahr LLP

(57) ABSTRACT

An air intake module for a projectile includes a module forward end (MFE), a module aft end (MAE), and an aft facing intake cone arrangement (AFICA). The air intake module is configured for connection to the forward portion and the propulsion system of the projectile. The MAE is longitudinally displaceable with respect to the MFE between a stowed configuration (wherein the MFE is at a first spacing with respect to the MAE) and a deployed configuration (wherein the MFE is at a second spacing, greater than the first spacing). The AFICA includes a plurality of intake cone elements, each being pivotably movable between an open position (corresponding to the stowed configuration) wherein the intake cone elements are overlying the MAE, and a closed position (corresponding to the deployed configuration) wherein the intake cone elements are pivoted towards one another to form an aft facing cone structure forward of the MAE.

20 Claims, 6 Drawing Sheets

(56) References Cited

U.S. PATENT DOCUMENTS

| | | | | |
|---|---|---|---|---|
| 4,944,226 | A | 7/1990 | Wedertz et al. | |
| 6,142,417 | A | 11/2000 | Figge, Sr. | |
| 6,584,764 | B2 | 7/2003 | Baker | |
| 6,886,775 | B2 | 5/2005 | Johnsson et al. | |
| 6,886,776 | B2 | 5/2005 | Wagner et al. | |
| 7,851,733 | B2 * | 12/2010 | Geswender | F42B 10/38 244/3.22 |
| 8,344,304 | B2 * | 1/2013 | Geswender | F02K 7/10 244/3.22 |
| 11,312,501 | B1 * | 4/2022 | Ress, Jr. | F25B 49/022 |
| 12,473,104 | B2 * | 11/2025 | Lin | B64U 50/19 |
| 2008/0000380 | A1 | 1/2008 | Dryer | |
| 2008/0041265 | A1 | 2/2008 | Geswender | |
| 2009/0229241 | A1 * | 9/2009 | Haight | F02K 9/30 60/253 |
| 2010/0251692 | A1 * | 10/2010 | Kinde, Sr. | F02K 7/16 60/767 |
| 2021/0333074 | A1 * | 10/2021 | Merems | F42B 10/14 |
| 2023/0417184 | A1 * | 12/2023 | Bond | F02C 7/185 |

* cited by examiner

AIR INTAKE MODULE FOR A PROJECTILE

TECHNOLOGICAL FIELD

The presently disclosed subject matter relates to projectiles, in particular to projectiles having air-breathing propulsion units.

BACKGROUND

Some types of projectiles, for example some types of missiles or rockets, have an air breathing engine, for example a turbojet engine, aligned with the projectile longitudinal axis. In some such cases, the projectile has a stowed form in which the air intake to the air breathing engine is essentially closed, and a deployed form in which the air intake is opened. The stowed form is generally shorter longitudinally with respect to the deployed form.

By way of non-limiting example, U.S. Pat. No. 7,851,733 (US 2008/0041265) discloses methods and apparatus for delivering a missile that may operate in conjunction with a missile comprising an outer skin. The missile may be configured in a closed position and an open position. In the open position, an aperture is opened in the outer skin, for example to supply air to an air-breathing engine. In the closed position, the aperture is closed.

Further by way of non-limiting example, U.S. Pat. No. 6,886,775 relates to a fin-stabilized artillery shell comprising a body part which can be axially displaced rearwards, in the direction of flight of the shell, once the latter has left the barrel from which it has been fired, and which in the original position is fully retracted in the shell, and in which a number of deployable fins are in turn secured, and from which the fins are automatically deployed as soon as the body part has reached its rear position in which it is locked relative to the rest of the shell.

Further by way of non-limiting example, U.S. Pat. No. 6,584,764 discloses a propulsion module including a wave rotor detonation engine having a rotor with a plurality of fluid flow channels. The fluid flow channels extend between an inlet rotor plate, which has a pair of fixed inlet ports, and an outlet rotor plate, which has a pair of fixed outlet ports. The propulsion module includes a pair of inlet ducts have a stowed mode and a deployed mode. The pair of inlet ducts include a fluid flow passageway adapted to convey air to the pair of inlet ports. A fueling system is positioned prior to the inlet ports to deliver fuel into the air introduced through the pair of inlet ducts and into the pair of inlet ports. A pair of ignition chambers are disposed adjacent to the inlet rotor plate.

Further by way of non-limiting example, U.S. Pat. No. 6,142,417 discloses a self-deploying inlet for an air breathing missile including an inlet body having a natural shape which defines a deployed condition for the air inlet, wherein an air deflecting surface is provided thereby. The inlet body is made from a material having a flexibility which enables the inlet body to flex from the deployed condition to a stowed condition, and a resiliency which biases the inlet body toward the deployed condition when in the stowed condition. The air inlet further includes a sealing connector system for connecting the inlet body to the vehicle in a manner which enables the inlet body to move between the stowed condition and the deployed condition. The natural spring force provided by the resiliency of the inlet body, along with the aerodynamic forces to which the inlet is subjected during missile flight, are sufficient to cause the inlet to self-deploy to the deployed condition from the stowed condition without the need for a deployment actuator.

Further by way of non-limiting example, U.S. Pat. No. 3,976,088 discloses a dual, side-mounted inlet for air-launched ramjet missiles that require high angle-of-attack capability. The inlets are located symmetrically on both sides of the vehicle pitch plane at an optimum angular displacement around the vehicle's lower surface from windward side meridian, lying in the pitch plane. The inlet pressure recovery and relative weight flow reach maximum values at angular displacements between 45° and 60° at positive angles of attack. The inlet is attached to the vehicle with a conventional boundary layer diverter of minimum height.

General Description

According to a first aspect of the presently disclosed subject matter, there is provided an air intake module for a projectile, comprising a module forward end, a module aft end, and an aft facing intake cone arrangement, wherein:

- said module forward end comprises a module forward interface configured for connecting the air intake module to a forward portion of the projectile;
- said module aft end comprises a module aft interface configured for enabling the air intake module to be mounted to a propulsion system of the projectile;
- said module aft end being longitudinally displaceable with respect to the module forward end between a module stowed configuration and a module deployed configuration, and, wherein in the module stowed configuration the module forward end is at a first longitudinal spacing with respect to the module aft end, wherein in the module deployed configuration the module forward end is at a second longitudinal spacing with respect to the module aft end, and wherein the second longitudinal spacing is greater than the first longitudinal spacing;
- said aft facing intake cone arrangement comprising a plurality of intake cone elements, each said intake cone element being pivotably mounted with respect to the module front end and being pivotably movable between a respective open position, corresponding to the module stowed configuration, and a respective closed position, corresponding to the module deployed configuration;
- wherein in the open position the intake cone elements are in overlying spatial relationship with respect to the module aft end; and
- wherein in the closed position, the intake cone elements are pivoted towards one another to form an aft facing cone structure forward of the module aft end.

For example, the air intake module comprises a plurality of sliding rail elements configured for selectively enabling said module aft end to be longitudinally displaced with respect to said module forward end between said module stowed configuration and said module deployed configuration. For example, said sliding rail elements are circumferentially spaced from one another around a periphery of the module forward end.

Additionally or alternatively, for example, said sliding rail elements are parallel to one another and to a central axis of the air intake module.

Additionally or alternatively, for example, each sliding rail element is in the form of a rail strut telescopically slidable with respect to a rail strut housing between a respective retracted position and a respective extended position, said rail struts being fixedly connected to the module forward end, and said rail strut housings being fixedly connected to the module aft end. For example, said retracted position corresponds to the module stowed configuration, and wherein the extended position corresponds to the module deployed configuration.

Additionally or alternatively, for example, said sliding rail elements comprise spring elements configured for selectively causing the rail struts to be extracted from the respective rail strut housings.

Additionally or alternatively, for example, the air intake module comprises a first locking mechanism having a respective locked configuration in which the air intake module is locked in the module stowed configuration, and a respective unlocked configuration, in which the air intake module can be selectively transitioned from the module stowed configuration to the module deployed configuration.

Additionally or alternatively, for example, the air intake module comprises a rail element locking mechanism, having a respective locked configuration in which the sliding rail elements are locked in the extended positions, corresponding to the module deployed configuration, and a respective unlocked configuration prior to the rail elements attaining the respective extended positions Additionally or alternatively, for example, in the module deployed configuration, the sliding rail elements in extended configuration provide open lateral portals in-between each laterally adjacent pair of said sliding rail elements, thereby providing free fluid communication between an outside environment of the air intake module and an inside of the module aft end.

Additionally or alternatively, for example, each said intake cone element is pivotably mounted with respect to the module forward end about a respective cone element pivot axis.

Additionally or alternatively, for example, each intake cone element has a general triangular plan form, including a base, blunted apex, and lateral edges, and defines an imaginary median line between a mid-point of the respective base and a mid-point of the respective blunted apex. For example, in said aft facing cone structure adjacent lateral edges of adjacent cone elements are parallel to one another, and wherein the respective blunted apexes of the cone elements are in proximity to one another, together forming an axial opening. Additionally or alternatively, for example, said intake cone elements are configured for pivoting at least partially into and through the open lateral portals in the module deployed configuration. Additionally or alternatively, for example, wherein said intake cone elements are intercalated circumferentially between the sliding rail elements.

Additionally or alternatively, for example, each said cone element pivot axis is orthogonal to the central axis and radially displaced therefrom, and wherein each said cone element pivot axis is orthogonal to a radial line projecting from the central axis and intersecting the median line of the respective intake cone element.

Additionally or alternatively, for example, the intake cone elements are biased to pivot in direction towards one another. For example, each intake cone element comprises a biasing element configured for biasing the intake cone elements to pivot in direction towards one another.

Additionally or alternatively, for example, the aft facing intake cone arrangement includes a cone element locking arrangement for locking together the intake cone elements in the aft facing cone structure. For example, said cone element locking arrangement includes any suitable mechanical lock.

Additionally or alternatively, for example, the air intake module further comprises a propulsion system accommodated in said module aft end. For example, the air intake module comprises a service line, said service line coupling the module forward end with the module aft end. For example, said service line provides coupling between an operational interface and at least said propulsion system. Additionally or alternatively, for example, said service line comprises a fuel line for supplying liquid fuel to the propulsion system. Additionally or alternatively, for example, said service line includes electrical lines for providing electrical power and/or control lines for providing electrical signals and/or electronic signals to the aft module end from the from module end. Additionally or alternatively, for example, said module forward end comprises a receptacle, having an aft-facing open end, the receptacle being configured for enabling a portion of the service line to be accommodated therein concurrent with the air intake module being in the module stowed configuration. For example, said receptacle is configured for allowing the service line to be extracted from the receptacle, as an aft end of the service line is pulled with the module aft end concurrent with the air intake module being transitioned from the module stowed configuration to the module deployed configuration. Additionally or alternatively, for example, in the module deployed configuration, the service line passes from operational interface through the aft facing cone structure and to the propulsion system.

Additionally or alternatively, for example, the air intake module comprises a plurality of vanes. For example, the vanes are pivotably mounted with respect to the aft module end. Alternatively, for example, the vanes are fixedly mounted with respect to the aft module end.

According to a second aspect of the presently disclosed subject matter there is provided a projectile, comprising a projectile forward end, longitudinally coupled to the air intake module as defined herein regarding the first aspect of the presently disclosed subject matter, and including the propulsion system as defined herein regarding the first aspect of the presently disclosed subject matter. For example, the propulsion system comprises at least one turbojet engine.

Additionally or alternatively, for example, the projectile has a stowed configuration corresponding to the module stowed confirmation, and a deployed configuration corresponding to the module deployed configuration.

According to a third aspect of the presently disclosed subject matter there is provided a method for deploying an air intake module, comprising:

- providing the air intake module, the air intake module being as defined herein regarding the first aspect of the presently disclosed subject matter;
- longitudinally displacing the module aft end with respect to the module forward end, between the first longitudinal spacing and the second longitudinal spacing.

According to a fourth aspect of the presently disclosed subject matter there is provided a method for deploying a projectile, comprising:

- providing the projectile, the projectile being as defined herein regarding the second aspect of the presently disclosed subject matter;
- longitudinally displacing the module aft end with respect to the module forward end, between the first longitudinal spacing and the second longitudinal spacing, to thereby deploy the projectile from the stowed configuration to the deployed configuration.

A feature of at least one example of the presently disclosed subject matter is that an air intake module is provided for a projectile, and in which the air intake module can enable the axial length of the projectile to be larger, in the deployed configuration, than that required for storing or transporting the projectile, corresponding to the stowed configuration.

Another feature of at least one example of the presently disclosed subject matter is that an air intake module is provided configured for deploying from the stowed configuration to the deployed configuration in a linear manner in one axial direction.

Another feature of at least one example of the presently disclosed subject matter is that an air intake module is provided having relatively simple mechanical construction.

Another feature of at least one example of the presently disclosed subject matter is that an air intake module is provided wherein deployment thereof does not require a powered actuation system.

Another feature of at least one example of the presently disclosed subject matter is that an air intake module is provided for a projectile, wherein the center of gravity of the projectile is moved aft during transitioning from the stowed configuration to the deployed configuration, thereby improving the overall static stability of the projectile as compared with prior to such deployment.

Another feature of at least one example of the presently disclosed subject matter is that an air intake module is provided wherein deployment thereof from the stowed configuration to the deployed configuration does not per se significantly increase or significantly affect aerodynamic drag of the respective projectile, and does not per se generate residual torques to the respective projectile, when deployment occurs during flight of the projectile, since the propulsion system is moved with the module aft end in a direction co-axial to or parallel with the projectile longitudinal axis.

Another feature of at least one example of the presently disclosed subject matter is that the air intake module provides a compact arrangement for a projectile.

Another feature of at least one example of the presently disclosed subject matter is that the air intake module effectively does not require the longitudinal length of the projectile body to be greater, nominally, than the aggregate length of the forward portion and the aft portion in the stowed configuration.

Another feature of at least one example of the presently disclosed subject matter is that the air intake module effectively does not require a longitudinal portion of the projectile body to be dedicated exclusively for accommodating the air intake module or part thereof.

Another feature of at least one example of the presently disclosed subject matter is that an air intake module is provided having a module aft end, wherein the module aft end can be configured for enabling vanes to be affixed thereto.

Another feature of at least one example of the presently disclosed subject matter is that a projectile having an air intake module is provided, and wherein the projectile can be launched from an airborne platform, for example from an externally suspended configuration or from a cannister-enclosed configuration, or from a ground platform, and for example including an accelerator unit.

Another feature of at least one example of the presently disclosed subject matter is that in implementations in which the corresponding projectile can be launched from an airborne platform from an initially externally suspended configuration, for example suspended from a pylon, in which the air intake module is in the respective stowed configuration, the propulsion system is automatically isolated from the external airflow, thereby inherently preventing windmilling of the engine(s) and/or inherently preventing foreign body damage (FOD) to the engine(s).

Another feature of at least one example of the presently disclosed subject matter is that in implementations in which the corresponding projectile can be launched from an airborne platform from an initially cannister-enclosed configuration, in which the air intake module is in the respective stowed configuration, the compact arrangement of the air intake module enables the size of the respective cannisters to be compact, or for a given axial length of the respective cannisters allows maximizing the axial length of the projectile in the stowed configuration to conform to the canister length.

Another feature of at least one example of the presently disclosed subject matter is that in implementations in which the corresponding projectile can be launched from a ground platform from a configuration including an accelerator unit while the air intake module is in the respective stowed configuration, allows for a compact arrangement while in the launcher, and further allows the air intake module to deploy the projectile to the deployed configuration after launch and disengagement from the accelerator unit.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
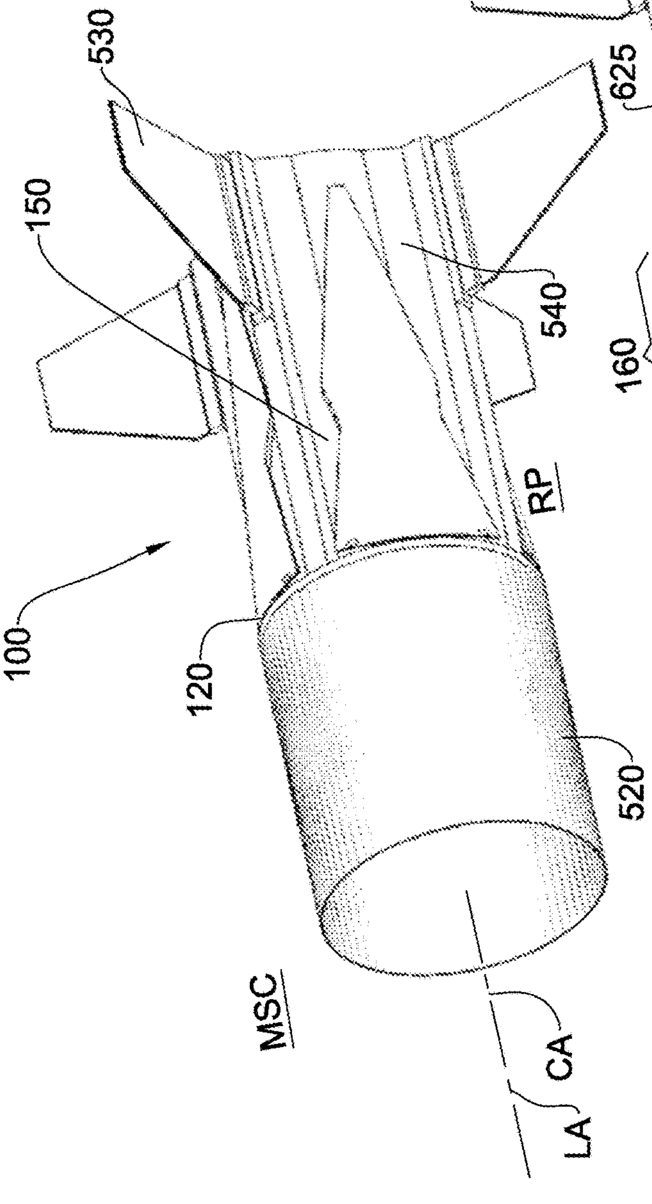
FIG. 1 shows in front-top-side isometric view an air intake module for a projectile according to a first example of the presently disclosed subject matter, in which the air intake module is in module stowed configuration.
Figure 2:
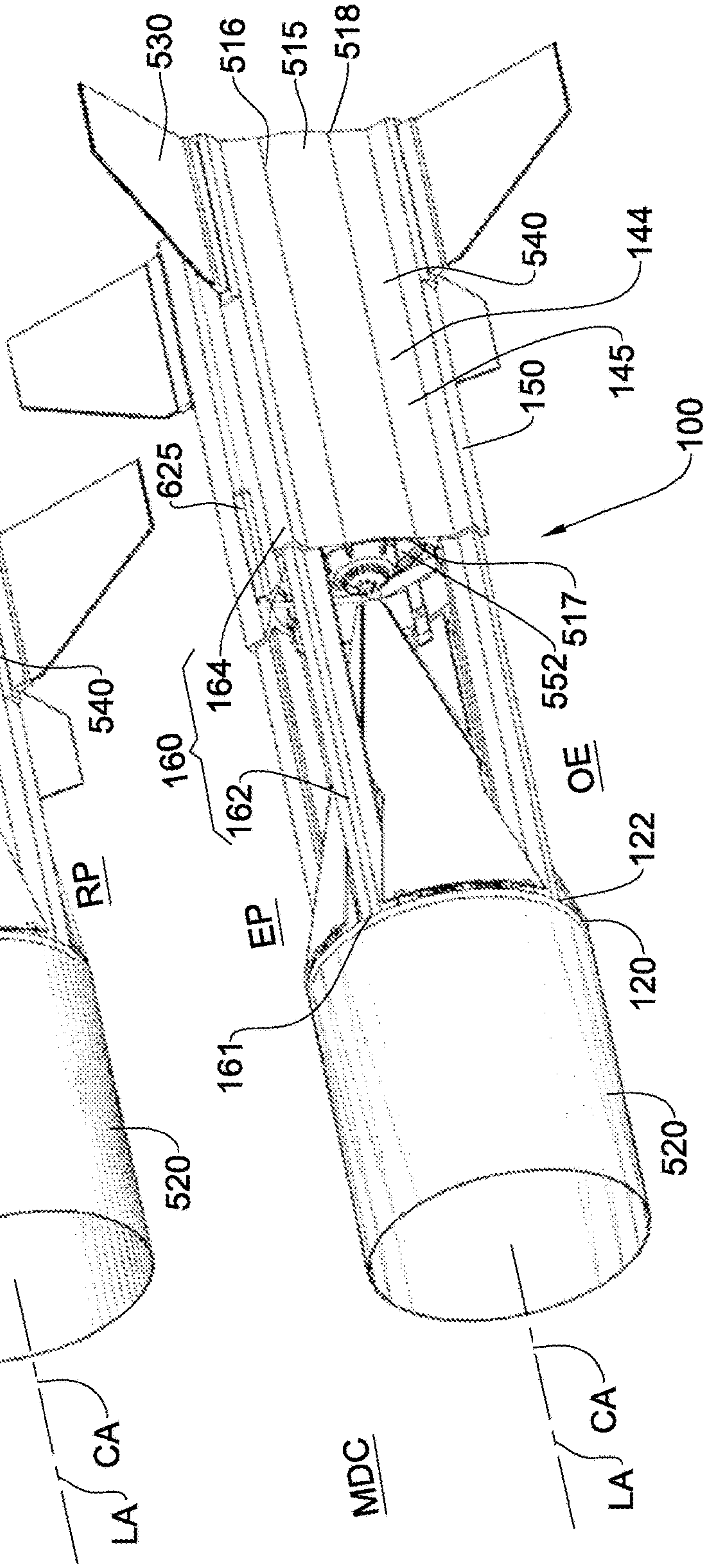
FIG. 2 shows in front-top-side isometric view the air intake module of the example of FIG. 1, in which the air intake module is in module deployed configuration.

Referring to FIGS. 1 and 2, an air intake module for a projectile according to a first example of the presently disclosed subject matter, generally designated 100, comprises a module forward end 120 and a module aft end 150.

Figure 3:
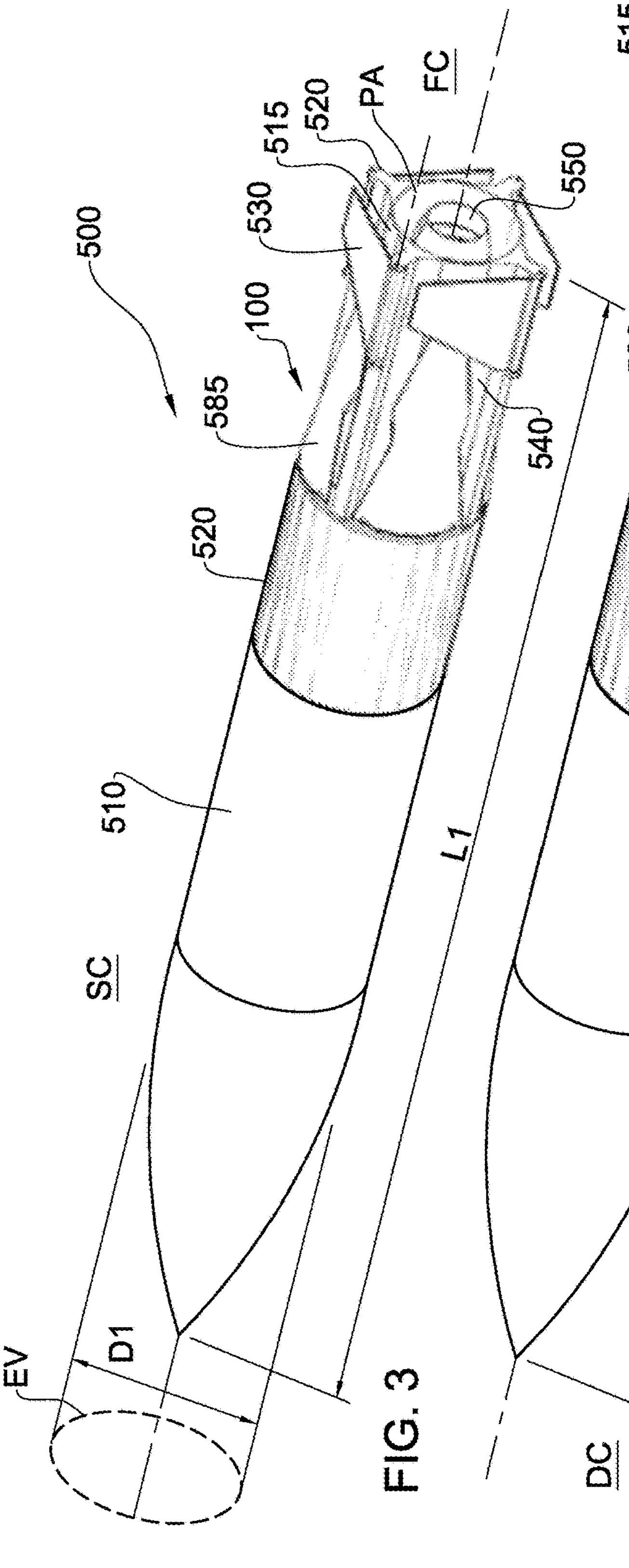
FIG. 3 shows in aft-top-side isometric view a projectile according to a first example of the presently disclosed subject matter including the air intake module example of FIG. 1, in which the projectile is in stowed configuration.
Figure 4:
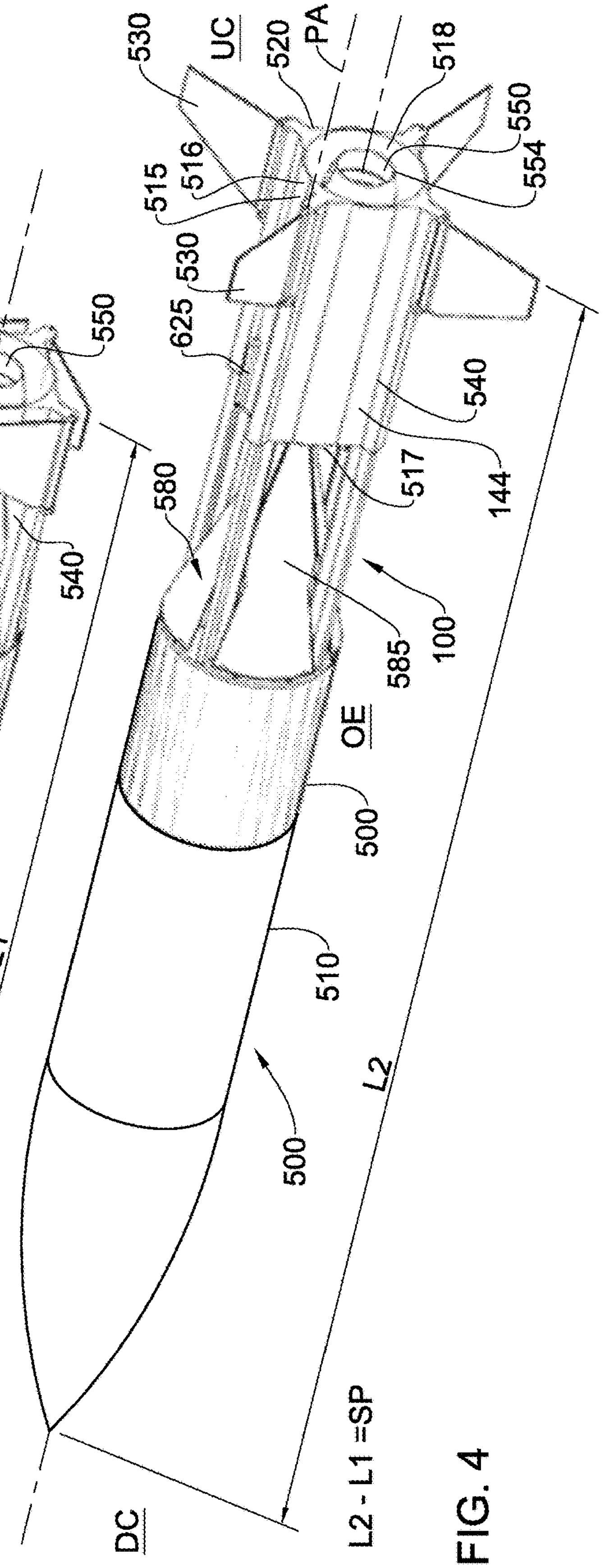
FIG. 4 shows in aft-top-side isometric view the projectile example of FIG. 3, in which the projectile is in stowed configuration.

Referring also to FIGS. 3 and 4 the air intake module 100 is configured for being included in the projectile body 510 of a projectile 500, and is configured for being mounted with respect to the projectile 500 in longitudinally intermediate relationship, i.e., in an axially intermediate relationship, between a forward part 520 of the projectile 500, and an aft portion 540 of the projectile 500.

The air intake module 100 is configured for transitioning between a module stowed configuration MSC and a module deployed configuration MDC, as will become clearer herein.

The projectile 500 is configured for transitioning between a stowed configuration SC as illustrated in FIG. 3, and a deployed configuration DC, as illustrated in FIG. 4, corresponding to and concurrent with deployment of the air intake module 100 between the module stowed configuration MSC and the module deployed configuration MDC, as will become clearer herein.

Also as will become clearer herein, such transitioning is in a linear manner in at least this example. Also as will become clearer herein, while in at least this example, such transitioning is in one axial direction, i.e., non-reversible from the stowed configuration to the deployed configuration but not vice-versa, in at least some alternative variations of this example, such transition can be reversible, allowing deployment of the air intake module 100 from the module stowed configuration MSC to the module deployed configuration MDC, and also stowing from the module deployed configuration MDC to the module stowed configuration MSC.

For the purpose of illustration, the projectile 500 can be in the form of a missile or rocket, and the forward end 520 can accommodate a payload, for example a warhead and/or reconnaissance package, and optionally navigation and steering modules, as known in the art. The aft portion 540 comprises a propulsion system 550 for driving the projectile 500, at least during part of the projectile flight after launch.

While in at least this example, the propulsion system 550 is in the form of an air-breathing engine in the form of a single turbojet engine, in at least some alternative variations of this example the propulsion system can include more than one turbojet engine.

As will become clearer herein, one effect of enabling transition of the projectile 500 from the stowed configuration SC to the deployed configuration DC, is that the propulsion system 550 is essentially isolated from, and thus protected from, any external airflow over the projectile 500, until it is desired to start operation of the propulsion system 550. Another effect of enabling transition of the projectile 500 from the stowed configuration SC to the deployed configuration DC, is that the overall length of the projectile 500 is concurrently increased. Another effect of enabling transition of the projectile 500 from the stowed configuration SC to the deployed configuration DC, is that the center of gravity of the projectile 500 is concurrently moved in an aft direction with respect to the geometrical axial center of the projectile, as comparted with the stowed configuration SC, thereby improving the overall static stability of the projectile 500 as compared with the static stability of the projectile 500 prior to such transition.

Figure 7:
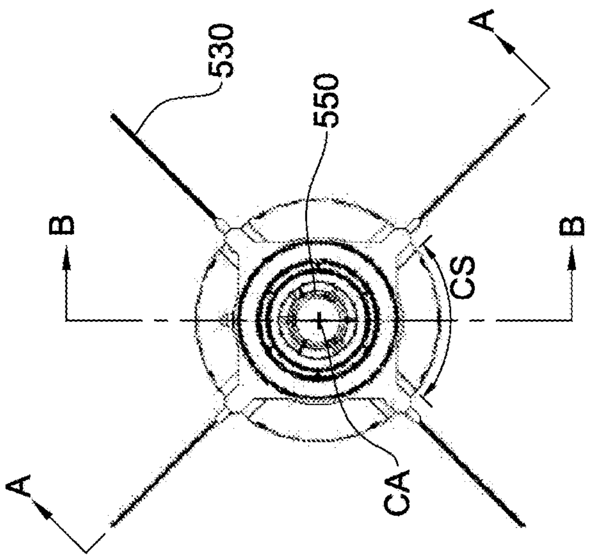
FIG. 7 shows in aft view the air intake module of the example of FIG. 6.

In at least this example, the projectile 500 has a plurality of fins or vanes 530 pivotably mounted to the projectile body 510, in particular to aft portion 540, and configured for providing longitudinal stability and/or steering during flight of the projectile 500. In the illustrated example the projectile 500 has four fins or vanes 530, in cruciform "X" configuration, as best seen in FIG. 7. However, in alternative variations of this example, and in other examples, the projectile can have three fins or vanes 530 or more than four fins or vanes 530, for example five, six, seven, eight or more than eight fins or vanes 530.

In at least some implementations of at least this example in which the fins or vanes 530 are configured for providing steering during flight of the projectile 500, the fins or vanes 530 are actuable, for example via suitable actuators, to provide suitable control moments to the projectile 500 in one or more of pitch, yaw and roll.

In yet other alternative variations of this example, the respective projectile can omit the fins or vanes 530, and for example can be spin stabilized and/or the respective projectile can comprise alternative arrangements for longitudinal stability and/or steering.

In at least this example, the fins or vanes 530 are each pivotable about a respective pivot axis PA between a folded configuration FC, and an unfolded configuration UC. In the folded configuration FC, the fins or vanes 530 are folded into generally overlying or abutting relationship with respect to a respective lateral portion 515 of the projectile body, providing a compact configuration for the fins or vanes 530 correlated with the stowed configuration SC. In at least this example, the fins or vanes 530 are relatively flat, and overlie or abut the relatively flat sides of the aft portion 540. However, in alternative variations of this example, in which for the example the aft portion 540 is generally cylindrical, the fins or vanes 530 can be correspondingly curvuate, for example.

In the unfolded configuration UC, the fins or vanes 530 are projecting generally radially away from the projectile body 510.

For example, the fins or vanes 530 can be biased, for example via a spring arrangement, to pivot about the respective pivot axes PA from the folded configuration FC to the unfolded configuration UC, soon after launch of the projectile 500.

In the stowed configuration SC, the projectile 500 has a relatively compact form, in which the vanes or fins 530 are in the folded configuration FC to ensure that all parts of the projectile 500 are within a cylindrical envelope EV of diameter D1, and wherein the projectile has a first longitudinal length L1.

In the deployed configuration DC, the projectile 500 has an extended form, wherein the vanes or fins 520 are in the unfolded configuration UC, and wherein the projectile has a second longitudinal length L2. The second longitudinal length L2 is greater than the first longitudinal length L1 by a spacing SP. In the deployed configuration, the vanes or fins 530 project outside the cylindrical envelope EV.

It is to be noted that in yet other alternative variations of the above examples, the vanes or fins are non-pivotable, and instead are fixed in the respective unfolded configuration.

In particular, in at least some implementations of at least this example, the projectile 500 is configured for being launched from a launch tube or the like, having an internal diameter complementary to the first diameter D1, including a suitable lateral tolerance therebetween, and wherein the internal longitudinal dimension of the launch tube is complementary to the first longitudinal length L1, including a suitable longitudinal tolerance therebetween. For example, such a lateral tolerance can be up to about 10% (±2%) of the first diameter D1, and/or, such a longitudinal tolerance can be up to about 10% (±2%) of the first longitudinal length L1.

The module forward end 120 comprises a module forward interface 122 configured for connecting the air intake module 100 to the forward portion 520 of the projectile 500. For example, the module forward interface 122 can be in the form of a bulkhead, or in the form of an aft portion of the forward part 520 of the projectile 500 for example in which the module forward interface 122 is integrally manufactured with the forward part 520.

In at least this example, the projectile 500 has a longitudinal axis LA, and the air intake module 100 has a central axis CA co-axial with the longitudinal axis LA. However, in alternative variations of this example, and in at least some other examples, the central axis CA can be parallel to, and laterally offset from, the longitudinal axis LA of the projectile 500.

The module aft end 150 comprises a module aft interface 140 configured for enabling the air intake module 100 to be mounted to the propulsion system 550 of the projectile 500.

In at least this example, the module aft interface 140 is in the form of an engine housing 145, configured for enabling the propulsion system 550 to be coupled thereto. The engine housing 145 comprises an external housing surface 144, which includes the respective lateral portions 515.

In at least this example, the module aft interface 140 is formed as part of the aft portion 540 of the projectile 500.

In at least this example, the module aft end 150 is configured for enabling the fins or vanes 530 to be affixed thereto, for example pivotably affixed thereto, and thus the respective lateral portions 515 of the projectile body are comprised in the module aft end 150.

In at least this example the engine housing 145 has a generally open box structure, having a rectangular or square transverse cross-section, with four generally flat walls 516 providing the relatively flat lateral portions 515, and the open box structure having an open forward end 517 and an open aft end 518.

It is to be noted however, that in alternative variations of this example, and in at least some other examples, the respective engine housing can have any suitable shape, for example including a polygonal transverse cross-section, or a circular cross-section, or an elliptical cross-section, or a super-elliptical cross-section, each with a corresponding external housing surface.

The engine housing 145 defines an internal volume in which the propulsion system 550 can be mounted, such that the inlet end 552 of the propulsion system 550 is provided at or near the open forward end 517, and the exhaust end 554 of the propulsion system 550 is provided at or near the open aft end 518.

The module aft end 150 is longitudinally displaceable with respect to the module forward end 120, between the module stowed configuration MSC and the module deployed configuration MDC.

In at least this example, the module stowed configuration MSC corresponds to the stowed configuration SC of the projectile 500, however independently of whether the vanes of fins 530 are in the folded configuration FC or in the unfolded configuration UC.

In at least this example, the module deployed configuration MDC corresponds to the deployed configuration DC of the projectile 500, however also independently of whether the vanes of fins 530 are in the folded configuration FC or in the unfolded configuration UC.

Figure 5:
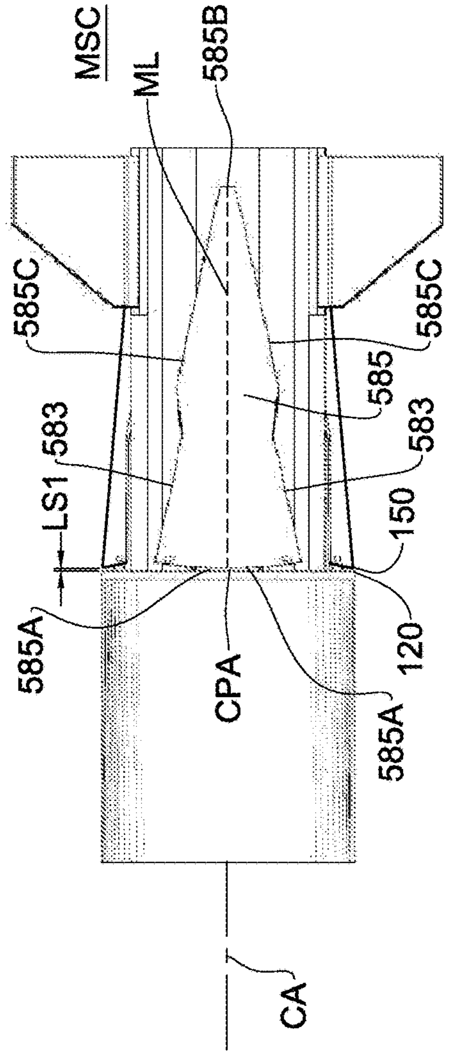
FIG. 5 shows in side view the air intake module example of FIG. 1, in which the air intake module is in module stowed configuration.
Figure 6:
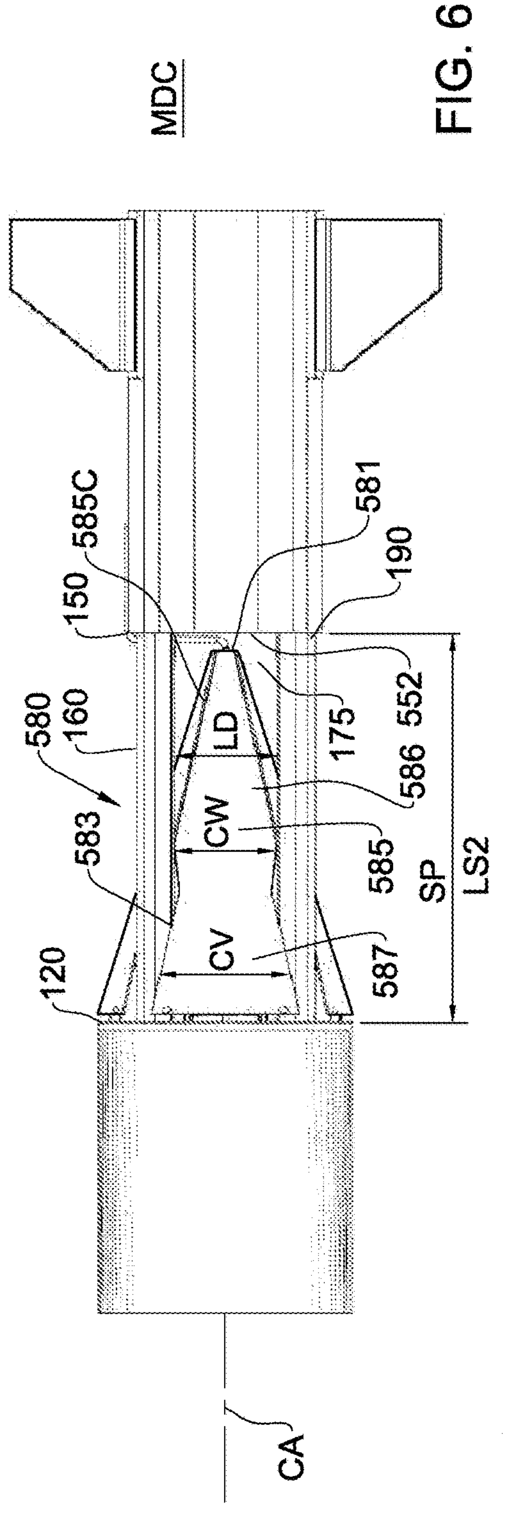
FIG. 6 shows in side view the air intake module of the example of FIG. 1, in which the air intake module is in module deployed configuration.

Referring also to FIGS. 5 and 6, in the module stowed configuration MSC, the module forward end 120 is at a first module longitudinal spacing LS1 with respect to the module aft end 150. In the module deployed configuration MDC, the module forward end 120 is at a second module longitudinal spacing LS2 with respect to the module aft end 150. The second module longitudinal spacing LS2 is greater than the first module longitudinal spacing LS1 by spacing SP.

In other words, in at least this example, the transitioning of the air intake module 100 from the module stowed configuration MSC to the module deployed configuration MDC essentially results in the longitudinal length of the projectile 500 correspondingly increasing from the first longitudinal length L1 to the second longitudinal length L2.

According to an aspect of the presently disclosed subject matter, the first module longitudinal spacing LS1 is nominally zero. In other words, the air intake module 100 effectively does not require the longitudinal length of the missile body 510 to be greater than the aggregate length of the forward portion 520 and the aft portion 540 in the stowed configuration SC, and thus effectively does not require a longitudinal portion of the projectile body 520 dedicated exclusively for accommodating the air intake module 100 or part thereof.

Thus, the air intake module 100 can enable the axial length of the projectile 500 to be larger in the deployed configuration DC, than that required for storing or transporting the projectile 500, corresponding to the stowed configuration SC.

In at least this example, the module aft end 150 is longitudinally displaceable with respect to the module forward end 120, between the module stowed configuration MSC and the module deployed configuration MDC, via a plurality of sliding rail elements 160.

In at least this example, the air intake module 100 also comprises a locking mechanism 170, having a locked configuration in which the air intake module 100 is locked in the module stowed configuration MSC, and an unlocked configuration, in which the air intake module 100 can be selectively transitioned from the module stowed configuration MSC to the module deployed configuration MDC. Thus, in the locked configuration, the locking mechanism 170 maintains the module front end 120 locked with the module aft end 150 at the first module longitudinal spacing LS1. In the unlocked configuration, the module front end 120 is able to be displaced longitudinally with respect to the module aft end 150 to provide the second module longitudinal spacing LS2.

For example, the locking mechanism 170 comprises a solenoid lock arrangement having a movable bolt element on one of the module front end 120 and the module aft end 150, and a bracket having an aperture in the other one of the module front end 120 and the module aft end 150. When the solenoid lock arrangement is unpowered the bolt element is received within the aperture, and prevents displacement between the bolt element and the bracket, and thus between the module front end 120 and the module aft end 150. When the solenoid lock arrangement is powered, for example responsive to receiving a suitable electrical current, which in turn can be generated by, or routed via, a controller, for example a controller that controls operation of the projectile, the bolt element is retracted from the aperture, and allows displacement between the bolt element and the bracket, and thus between the module front end 120 and the module aft end 150.

Alternatively, the locking mechanism 170 can be in the form of a mechanical arrangement having an unlocking element that is mechanically operated responsive to the projectile exiting a respective cannister or launch tube.

In at least this example, the sliding rail elements 160 are circumferentially spaced from one another around a periphery of the module forward end 120, and the sliding rail elements 160 are parallel to one another and to the central axis CA. Also in at least this example, there are four sliding rail elements 160 uniformly spaced from one another circumferentially about the central axis CA by respective circumferential spacings CS (FIG. 7).

While in at least this example, the pivot axes PA of the vanes or fins 530 are circumferentially aligned with the sliding rail elements 160, in alternative variations of this example, and at least in some other examples, the pivot axes PA of the vanes or fins 530 can be circumferentially offset with respect to the sliding rail elements 160. Additionally or alternatively, while in at least this example, the pivot axes PA of the vanes or fins 530 are nominally parallel with respect to the central axis CA, in alternative variations of this example, and at least in some other examples, the pivot axes PA of the vanes or fins 530 can be at a suitable angle with respect to the central axis CA.

However, in alternative variations of this example, and in at least other examples, the number of sliding rail elements can be less than four, for example one, two or three, or greater than four, for example five, six, seven, eight or more than eight. Additionally or alternatively, the respective one or more sliding rail elements can be provided at the outer periphery of the module forward interface 122, or radially inwardly disposed with respect to the outer periphery of the module forward interface 122, or radially outwardly disposed with respect to the outer periphery of the module forward interface 122. In at least one such example, for example, the respective air intake module can comprise a single sliding rail element, co-axial with the central axis CA or parallel with but transversely spaced from the central axis CA.

Figure 8:
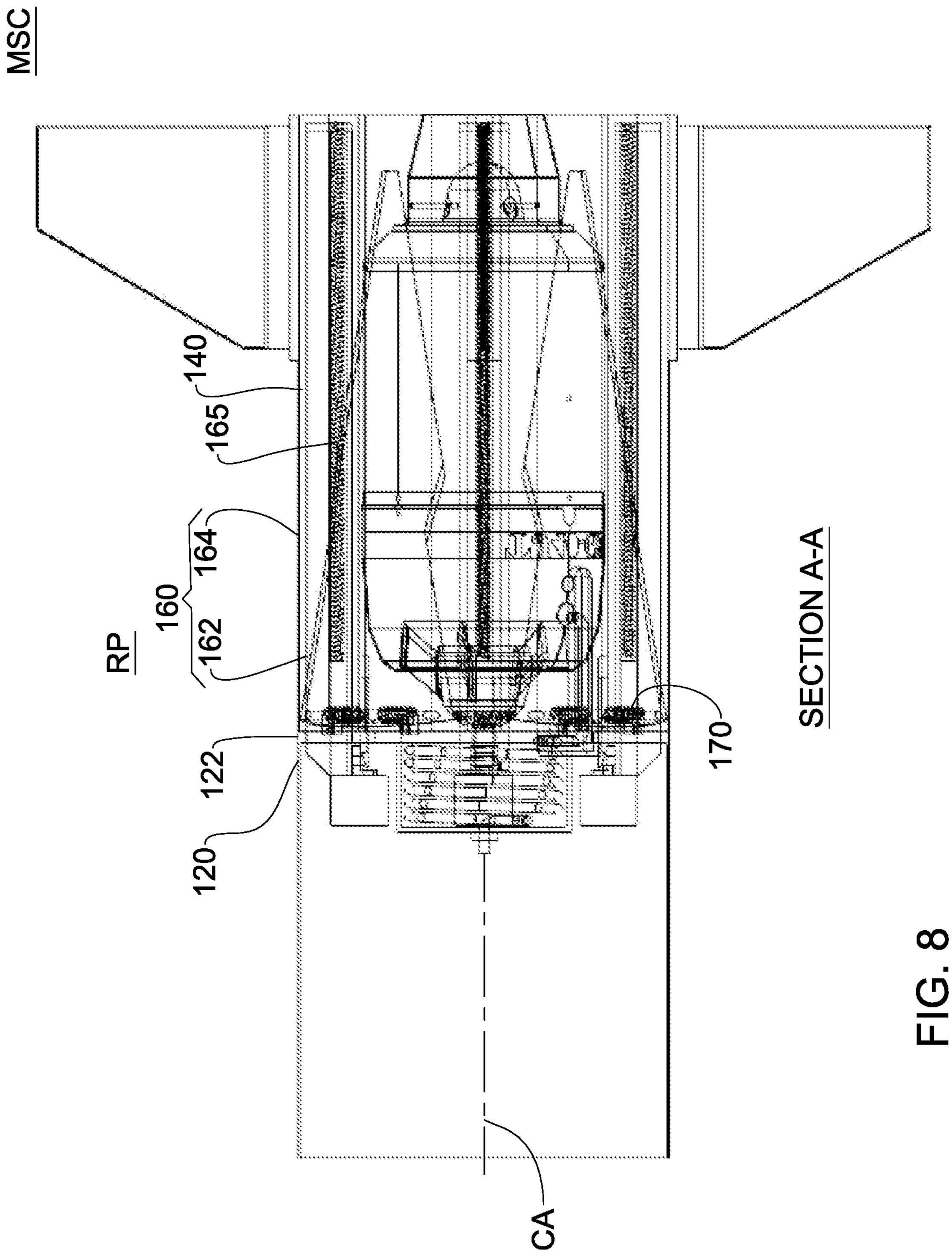
FIG. 8 shows in cross-sectional side view the air intake module example of FIG. 1, taken along A-A in FIG. 6, in which the air intake module is in module stowed configuration.
Figure 9:
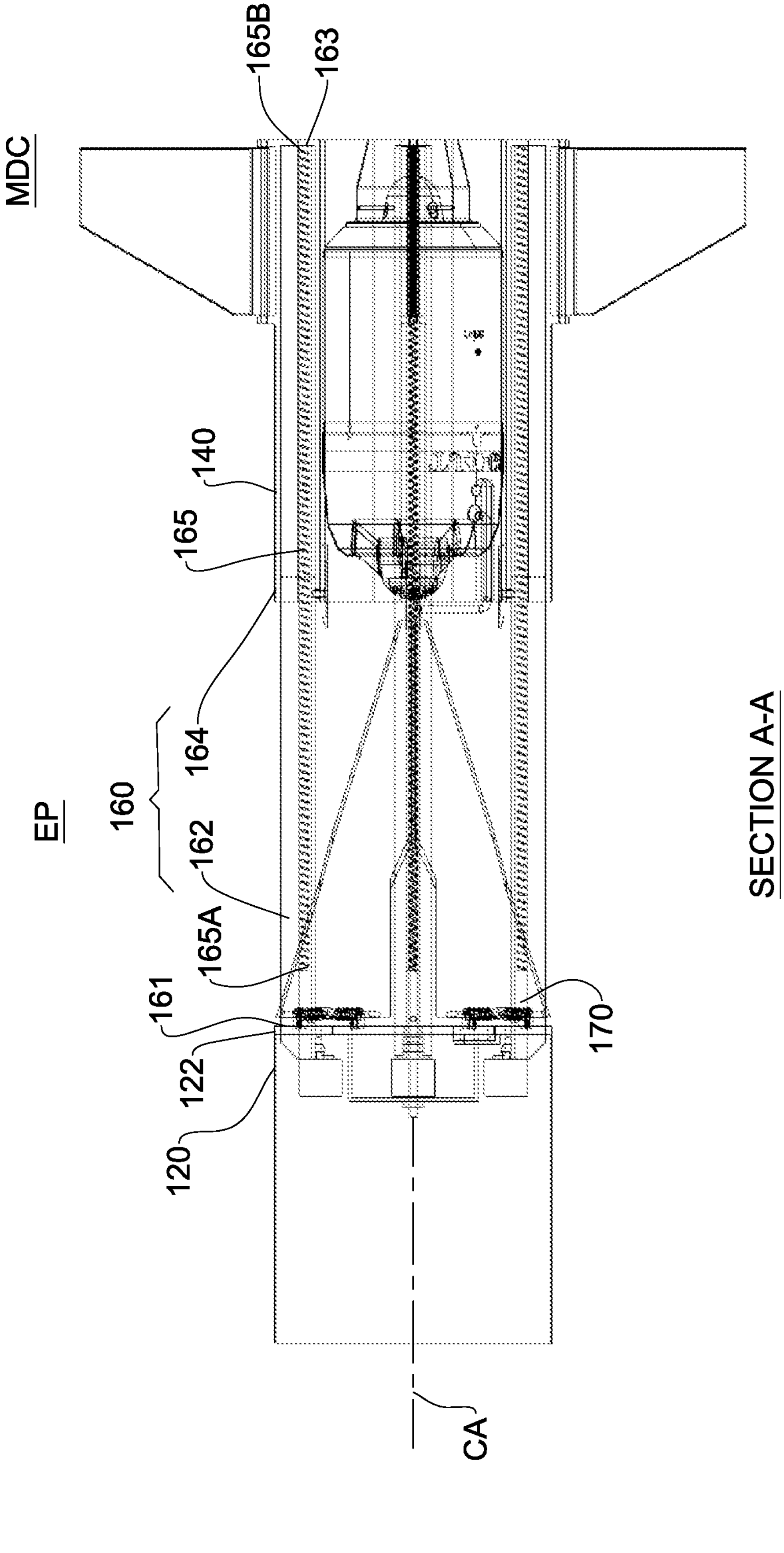
FIG. 9 shows in cross-sectional side view the air intake module of the example of FIG. 1, taken along A-A in FIG. 6, in which the air intake module is in module deployed configuration.

Referring also to FIGS. 8 and 9, in at least this example, each sliding rail element 160 is in the form of a rail strut 162 telescopically slidable with respect to a rail strut housing 164 between a respective retracted position RP and a respective extended position EP. The respective rail struts 162 are each fixedly connected at a forward end 161 thereof to the module forward end 120, for example to the module forward interface 122, whereas the rail strut housings 164 are fixedly connected to the module aft end 150, for example to the module aft interface 140, in particular to the engine housing 145.

The retracted position RP corresponds to the module stowed configuration MSC, and the rail struts 162 are nominally fully retracted within the respective rail strut housings 164.

The extended position EP corresponds to the module deployed configuration MDC, and the rail struts 162 are nominally fully extended and longitudinally projecting outside of the respective rail strut housings 164, in a direction parallel to the central axis CA.

In at least this example, the rail struts 162 are hollow and each comprises a lumen, accommodating therein a spring element 165. One longitudinal end 165A of each spring element 165 is affixed to the inside of the respective forward end 161 of the respective rail strut 162, and the other longitudinal end 165B of each spring element 165 is affixed to the inside aftmost end of the 163 of the respective rail strut housing 164.

The spring elements 165 are pre-stressed when the sliding rail elements 160 are in the retracted positions RP, and have sufficient stored potential energy to cause the respective rail struts of each spring element 165 to be extracted away from the respective rail strut housings 164, responsive to the locking mechanism 170 being released to the unlocked position.

This arrangement enables the air intake module 100 to transit from the module stowed configuration MSC to the module deployed configuration MDC essentially in an unpowered manner, i.e., without the need for powered actuators to act on the sliding rail elements 160 in a manner such as to cause such transitioning.

It is to be noted that in at least some alternative variations of this example, and in at least some other examples, the respective air intake module can omit the spring elements 165, and the sliding rail elements 160 can extend for example under the action of aerodynamic forces acting on the projectile 500. This arrangement also enables the air intake module 100 to transit from the module stowed configuration MSC to the module deployed configuration MDC essentially in an unpowered manner, i.e., without the need for powered actuators to act on the sliding rail elements 160 in a manner such as to cause such transitioning.

The sliding rail elements 160 are configured for supporting mechanical loads between the module front end 120 and the module aft end 150 in the module deployed configuration MDC, and thus for supporting mechanical loads between the front portion 510 and the aft portion 540 of the projectile 500, during operation of the projectile 500 including flight thereof. Such mechanical loads can include static loads as well as dynamic loads, at least part of which can be aerodynamically generated.

In at least this example, and referring for example to FIG. 6, the air intake module 100 comprises a rail element locking mechanism 190, having a locked configuration in which the sliding rail elements 160 are locked in the extended positions EP, corresponding to the module deployed configuration MDC. The rail element locking mechanism 190 has an unlocked configuration prior to the rail elements 160 attaining the respective extended positions EP, thereby allowing the sliding rail elements 160 to extend as the air intake module 100 is selectively transitioned from the module stowed configuration MSC to the module deployed configuration MDC. In the unlocked configuration, the module front end 120 is thus able to be displaced longitudinally with respect to the module aft end 150 to provide the second module longitudinal spacing LS2. Thus, in the locked configuration, the rail element locking mechanism 190 maintains the module front end 120 locked with the module aft end 150 at the second module longitudinal spacing LS2. In at least some alternative variations of this example, the locked configuration is reversible, enabling the sliding rail elements 160 to be returned to the respective retracted positions RP.

In the module deployed configuration MDC, the sliding rail elements 160 in extended configuration EC essentially provide open lateral portals 175 in-between each laterally adjacent pair of sliding rail elements 160 that allow free fluid communication between an outside environment OE of the projectile 500, and the inside of the module aft end 150, in particular the inlet end 552 of the propulsion system 550, as best seen in FIG. 6.

Thus, as the air intake module 100 is transitioned from the module stowed configuration MSC to the module deployed configuration MDC, the open lateral portals 175 allow ambient air to flow therethrough from the outside environment OE and to the propulsion system 550 via the inlet end 552 thereof.

Referring in particular to FIGS. 1 to 4, to further facilitate and direct the flow of ambient air from the outside environment OE into the inlet end 552 (and thus to the propulsion system), particularly when the projectile 500 is in flight, the air intake module 100 further comprises an aft facing intake cone arrangement 580.

The aft facing intake cone arrangement 580 comprises a plurality of distinct intake cone elements 585. Each said intake cone element 585 is pivotably mounted with respect to the module forward end 120, in particular with respect to the module forward interface 122 about a respective cone element pivot axis CPA.

Referring for example to FIG. 5, each intake cone element 585 in at least this example has a general triangular plan form, with base 585A, blunted apex 585B, and lateral edges 585C. An imaginary median line ML can be defined between a mid-point of the base 585A and a mid-point of the blunted apex 585B.

Each said intake cone element 585 is pivotably movable at the base 585A thereof about the respective cone element pivot axis CPA between a respective open position, corresponding to the module stowed configuration MSC, and a respective closed position, corresponding to the module deployed configuration MDC.

As best seen in FIGS. 1 and 3, in the open position the intake cone elements 585 are each in overlying spatial relationship with respect to the module aft end 150, whereas in the closed position, and as best seen in FIGS. 2 and 4, the intake cone elements 585 are pivoted towards one another about the respective cone element pivot axes CPA to form an aft facing cone structure 590 forward of the module aft end 150. In the closed position, and referring to FIG. 6, adjacent lateral edges 585C of the cone elements 585 are parallel to one another, and the respective blunted apexes 585B of the cone elements 585 are in proximity to one another, together forming an axial opening 581. The axial opening 581 is aligned with the central axis CA.

The intake cone elements 585 are configured for pivoting at least partially into and through the open lateral portals 175 in the module deployed configuration MDC. Thus, in at least this example, the intake cone elements 585 are intercalated circumferentially between the sliding rail elements 160.

Furthermore, and referring for example to FIG. 6, at least in this example, each intake cone element 585 has an aft cone element portion 586 having a lateral width CW less than a lateral width LD of the respective open lateral portals 175, and a forward cone element portion 587 having a lateral width CV greater than the lateral width LD of the respective open lateral portals 175. Furthermore, each intake cone element 585 has a cut-out portion 583 at each lateral side thereof, extending along the longitudinal length of the forward cone element portion 587. Thus, in the closed position, the aft cone element portions 586 are radially inward of the sliding rail elements 160, and the cut-out portions 583 laterally abut the sliding rail elements 160.

In at least this example, the aft facing intake cone arrangement 580 comprises four distinct intake cone elements 585, corresponding to the four open lateral portals 175 defined by the four sliding rail elements 160. However, in alternative variations of this example, and in at least some other examples, the respective aft facing intake cone arrangement can include any suitable number of respective intake cone elements, for example one, two, three or more intake cone elements per open lateral portal 175 formed by each adjacent pair of sliding rail elements 160.

In at least this example, each intake cone element 585 has a generally curvuate external surface that forms part of a conical or frustroconical surface, and thus the aft facing cone structure 590 has a generally conical or generally frustoconical form. However, in alternative variations of this example, and in at least some other examples, the particular form of the respective cone elements and the respective aft facing cone structure can be different. For example, each respective cone element can have a respective external surface that can be nominally flat comprising a single facet, or comprising a plurality of facets, such that the respective aft facing cone structure having a pyramidical form, having a plurality of sides corresponding to the facets. In yet other alternative variations of this example, and in at least some other examples, the particular form of the respective cone elements and the respective aft facing cone structure can be ogive-shaped or biconic cone shaped, or any other suitable shape; in such examples, each respective cone element can have a respective external surface that is part of the aft facing cone structure, such that the respective aft facing cone structure of the required shape is formed when the respective cone elements come together.

In at least this example, each cone element pivot axis CPA is orthogonal to the central axis CA and radially displaced therefrom. Each cone element pivot axis CPA is also orthogonal to a radial line projecting from the central axis CA and intersecting the median line ML of the respective intake cone element 585.

In at least this example, the intake cone elements 585 are biased to pivot in direction towards one another, towards the central axis CA. For example, and referring to FIG. 11, each intake cone element 585 comprises a biasing element 589, for example in the form of a torsion spring or other spring. In the module stowed configuration MSC, the biasing elements maintain the intake cone elements 585 in abutment with the external housing surface 144.

Thus, for example, as the air intake module 100 transitions from the module stowed configuration MSC to the module deployed configuration MDC, the intake cone elements 585 stay in abutment with the external housing surface 144 until the sliding rail elements 160 are in the respective extended positions EP whereupon the blunt apexes 585B are now forward of the open forward end 517 of the engine housing 145. At this point, the intake cone elements 585 are no longer abutting the external housing surface 144, and the biasing elements 589 drive the intake cone elements 585 together towards the central axis CA to form the aft facing cone structure 590.

It is to be noted that in at least some alternative variations of this example, and in at least some other examples, the respective air intake module can omit the biasing elements 589, and in such cases the intake cone elements 585 can be pivoted together towards the central axis CA to form the aft facing cone structure 590, for example by action of the external airflow as the projectile 500 is in forward flight.

Optionally, in this and/or other examples, the aft facing intake cone arrangement 580 can include a cone element locking arrangement for locking together the intake cone elements 585 in the aft facing cone structure 590. For example, cone element locking arrangement can include any suitable mechanical lock, for example in the form of pins provided in the intake cone elements that are inserted into corresponding holes when the intake cone elements form the aft facing cone structure 590. In at least some alternative variations of this example, cone element locking arrangement is reversible or can be omitted, enabling the intake cone elements 585 to be selectively returned to their original overlying positions over the external housing surface 144.

Figure 10:
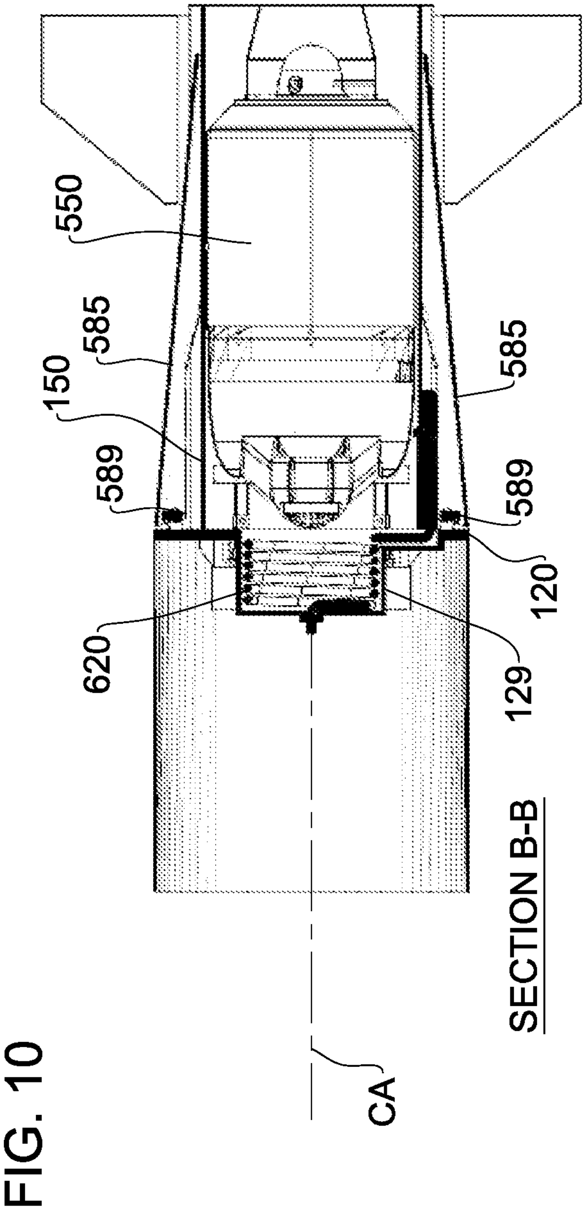
FIG. 10 shows in cross-sectional side view the air intake module example of FIG. 1, taken along B-B in FIG. 6, in which the air intake module is in module stowed configuration.
Figure 11:
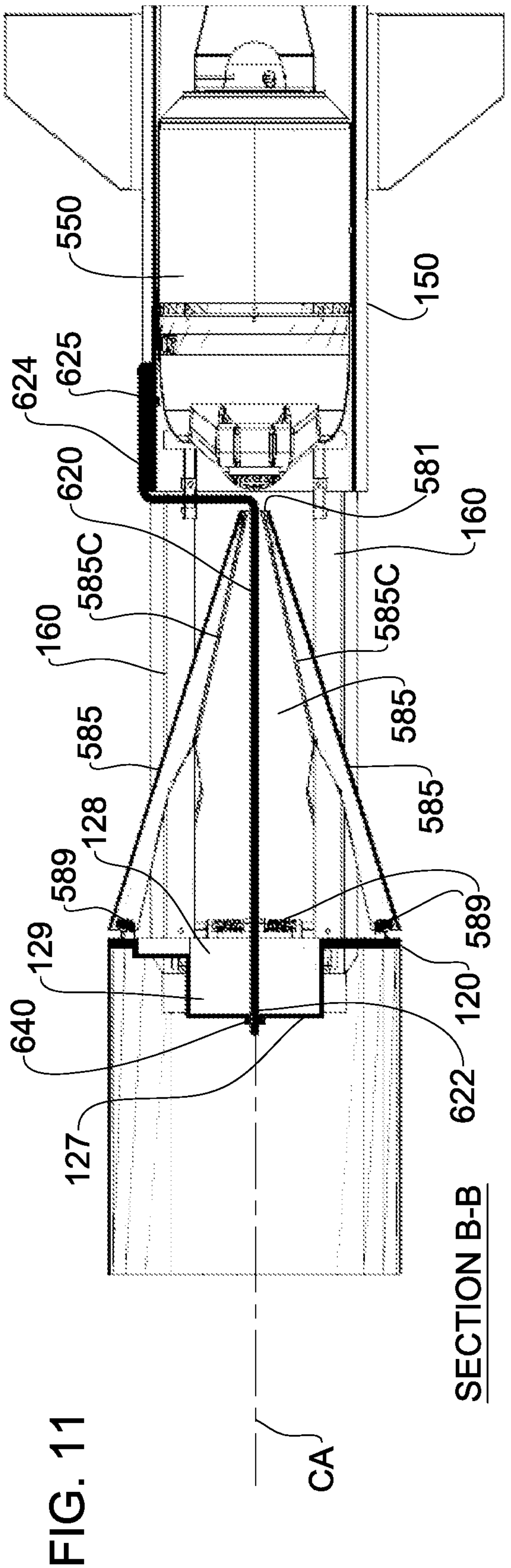
FIG. 11 shows in cross-sectional side view the air intake module of the example of FIG. 1, taken along B-B in FIG. 6, in which the air intake module is in module deployed configuration.

Referring to FIGS. 10 and 11, in at least this example the air intake module 100 further comprises a service line 620 coupling the module forward end 120 with the module aft end 150. More particularly, the service line 620 provides coupling between an operational interface 640 and at least the propulsion system 550.

The service line 620 is thus coupled at a forward end 622 thereof to the operational interface 640, and at the aft end 624 thereof to at least the propulsion system 550. In at least this example, the aft end 624 of the service line 620 is guided to the propulsion system 550 via a dorsal channel 625 provided on the external housing surface 144 (FIGS. 2, 4, 11).

In at least this example, the propulsion system 550 is run by liquid fuel, and the service line 620 comprises a fuel line for supplying liquid fuel to the propulsion system 550. Thus, in at least this example, the operational interface 640 is operatively coupled to a fuel tank comprising the liquid fuel, such a fuel tank being accommodated in the forward part 520 of the projectile 500.

The service line 620 can also include electrical lines for providing electrical power and/or control lines for providing electrical signals and/or electronic signals to the propulsion system 550 and/or to actuators that are configured for operating the vanes or fins 520 (for example, in examples in which the vanes or fins 520 are operable for steering).

In at least this example, the module forward end 120 comprises a receptacle 129, for example cylindrically shaped, having an aft-facing open end 128, and a forward end 127; the forward end 127 comprises the operational interface 640.

The receptacle 129 is configured for enabling a portion of the service line 620 to be accommodated therein, for example in helical arrangement, when the air intake module 100 is in the module stowed configuration MSC, for example as illustrated in FIG. 11.

The receptacle 129, and in particular the aft-facing open end 128 thereof, is configured for allowing the service line 620 to be extracted from the receptacle 129, as the aft end 624 of the service line 620 is pulled with the module aft end 150 concurrent with the air intake module 100 being transitioned from the module stowed configuration MSC to the module deployed configuration MDC. In the module deployed configuration MDC, the service line 620 effectively passes from operational interface 640 inside the receptacle 129, through the axial opening 581 and radially to dorsal channel 625, and then to the propulsion system 550. At least part of the service line 620 can continue to actuators that are configured for operating the vanes or fins 520 (for example, in examples in which the vanes or fins 520 are operable for steering).

The projectile 500, comprising the air intake module 100 can operate as follows, for example.

The projectile 500 is in the stowed configuration SC, with the air intake module 100 in the respective module stowed configuration MSC, during storage and transport, and remains in this configuration until after the projectile 500 is launched from a launch tube or the like, for example. Shortly after launch, the fins or vanes 530 are unfolded from the folded configuration FC to the unfolded configuration UC by pivoting about the respective pivot axes PA. Concurrently or thereafter, the air intake module 100 operates to transit from the module stowed configuration MSC to the module deployed configuration MDC, concurrently transitioning the projectile from the stowed configuration SC to the deployed configuration DC.

At the start of said transitioning, the locking mechanism 170 is unlocked to the unlocked configuration, and the spring elements 165 are now free to mechanically urge the module front end 120 and the module aft end 150 to be spaced from one another longitudinally via the sliding rail elements 160.

Concurrently with said transitioning, the intake cone elements 585 stay in abutment with the external housing surface 144 until the sliding rail elements 160 are in the respective extended positions EP whereupon the blunt apexes 585B are now forward of the open forward end 517 of the engine housing 145. At this point, the intake cone elements 585 are no longer abutting the external housing surface 144, and the biasing elements 589 drive the intake cone elements 585 together towards the central axis CA and lock together to form the aft facing cone structure 590.

Also concurrent with said transitioning, the service line 620 is pulled with the module aft end 150 until, in the module deployed configuration MDC, the service line 620 effectively passes from operational interface 640 inside the receptacle 129, through the axial opening 581 and radially to dorsal channel 625, and then to the propulsion system 550.

Once the module deployed configuration MDC is achieved, the rail element locking mechanism 190 is locked in the locked configuration in which the sliding rail elements 160 are locked in the extended positions EP.

At this point the open lateral portals 175 allow ambient air from the outside environment OE of the projectile 500 to flow through the open lateral portals 175 and into the inlet end 552 of the propulsion system 550, enabling the propulsion system 550 to generate thrust from propelling the projectile 500.

It can be appreciated that deployment the projectile 500 from the stowed configuration to the deployed configuration is not considered to per se increase aerodynamic drag of the respective projectile. It can also be appreciated that deployment the projectile 500 from the stowed configuration to the deployed configuration is not considered to per se generate residual torques to the respective projectile, since the propulsion system is moved with the module aft end in a direction co-axial to or parallel with the projectile longitudinal axis.

In at least this example, the projectile 500 is configured to be launched using any suitable launch system. In at least one example, the projectile 500 is configured to be launched from an airborne platform, for example from an externally suspended configuration or from a cannister-enclosed configuration.

In the externally suspended configuration, the projectile 500, in the stowed configuration SC, is attached to an external part of an air vehicle, for example via a pylon that is joined to underside of a wing or the fuselage. In at least this example, while the external surface of the projectile 500 is exposed to airflows while the air vehicle is in flight, the stowed configuration SC ensures that the propulsion system 550 is isolated from the external airflow while still attached to the air vehicle, in particular during takeoff and landing. Moreover, the stowed configuration SC prevents airflow from entering the propulsion system 550 while the projectile is still attached to the air vehicle at such conditions which would otherwise result in prolonged windmilling of the engine(s) and/or minimizes risk from foreign body damage (FOD). In such examples, the vanes or fins can be non-pivotable, and thus in the unfolded configuration even in the stowed configuration SC. In such examples, the vanes or fins are in the unfolded configuration, and the propulsion system 550 is protected inside the projectile for the duration of the flight until it is desired to launch the projectile. If early start of the propulsion system 550 is required while the projectile is still affixed to the air vehicle, the projectile 500 is transitioned from the stowed configuration SC to the deployed configuration DC, and the propulsion system 550 started, prior to release and launch from the air vehicle. Alternatively, in some cases it can be desired to implement a gliding maneuver to the projectile 500 to achieve maximum range or to reach the desired starting envelope of the engine, and in such cases the transitioning from the stowed configuration SC to the deployed configuration DC, and start of the propulsion system 550, can be delayed until the projectile 500 reaches the desired starting area during gliding.

In the cannister-enclosed configuration the projectile 500, in the stowed configuration SC, is enclosed within a canister, for example a launch tube which is attached to an external part of an air vehicle, for example via a pylon that is joined to underside of a wing or the fuselage. In at least this example, the stowed configuration SC minimizes the axial length of the cannister, and ensures that the propulsion system 550 is isolated from the external airflow while still attached to the air vehicle, in particular during takeoff and landing. In such examples, the vanes or fins are pivotable, and thus in the folded configuration while the projectile 500 is stowed in the cannister. In such examples, the vanes or fins are in the folded configuration, and the propulsion system 550 is protected inside the cannister for the duration of the flight until it is desired to launch the projectile. When launching the projectile from within the cannister, the projectile 500 is transitioned from the stowed configuration SC to the deployed configuration DC, and the propulsion system 550 started, prior to or just after release and launch from the air vehicle. Alternatively, in some cases it can be desired to implement a gliding maneuver to the projectile 500 to achieve maximum range or to reach the desired starting envelope of the engine, and in such cases the transitioning from the stowed configuration SC to the deployed configuration DC, and start of the propulsion system 550, can be delayed from after the projectile 500 is released form the cannister and until the projectile 500 reaches the desired starting area during gliding. The compact arrangement of the air intake module 100 enables the size of the respective cannisters to be compact, or, for a given axial length of the respective cannisters allows maximizing the axial length of the projectile in the stowed configuration to conform to the canister length.

In at least some alternative variations of these examples, the projectile 500 is configured to be launched from a ground platform, which can include any one of a land base, a mobile platform, a seafaring vessel, a submerged vessel, and so on. In such cases, an accelerator unit, for example a booster rocket, can be attached to the aft end of the projectile, and operates to launch the projectile and to accelerate the projectile to the desired speed, and at an appropriate stage the flight computer initiates the detachment mechanism of the acceleration unit from the projectile. Prior to launch, the projectile can be stored and/or transported in a launcher for example in the form of a relatively short launch cannister or launch tube, in the stowed configuration SC and in which the pivotable vanes or fins are in the folded configuration. After launch, and during acceleration via the acceleration unit, or immediately after the acceleration unit is released, the vanes or fins are pivoted to the unfolded configuration, and the projectile 500 is transitioned from the stowed configuration SC to the deployed configuration DC, and the propulsion system 550 started. The configuration of the air intake module 100 allows for a compact arrangement while in the launcher, and further allows the air intake module 100 to deploy the projectile 500 to the deployed configuration after launch and disengagement from the accelerator unit.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A projectile air intake module, comprising:

a module forward end;

a module aft end; and an aft facing intake cone arrangement, wherein:

said module forward end comprises a module forward interface;

said module aft end comprises a module aft interface;

said module aft end being longitudinally displaceable with respect to the module forward end between a module stowed configuration and a module deployed configuration, and, wherein in the module stowed configuration the module forward end is at a first longitudinal spacing with respect to the module aft end, wherein in the module deployed configuration the module forward end is at a second longitudinal spacing with respect to the module aft end, and wherein the second longitudinal spacing is greater than the first longitudinal spacing;

said aft facing intake cone arrangement comprising a plurality of intake cone elements, each said intake cone element being pivotably mounted with respect to the module front end and being pivotably movable between a respective open position, corresponding to the module stowed configuration, and a respective closed position, corresponding to the module deployed configuration;

wherein in the open position the intake cone elements are in overlying spatial relationship with respect to the module aft end; and wherein in the closed position, the intake cone elements are pivoted towards one another to form an aft facing cone structure forward of the module aft end.

2. The projectile air intake module according to claim 1, further comprising a plurality of sliding rail elements configured for selectively enabling said module aft end to be longitudinally displaced with respect to said module forward end between said module stowed configuration and said module deployed configuration.

3. The projectile air intake module according to claim 2, wherein said sliding rail elements are circumferentially spaced from one another around a periphery of the module forward end.

4. The projectile air intake module according to claim 2, wherein said sliding rail elements are parallel to one another and to a central axis of the projectile air intake module.

5. The projectile air intake module according to claim 2, including one of the following:

wherein each sliding rail element is in the form of a rail strut telescopically slidable with respect to a rail strut housing between a respective retracted position and a respective extended position, said rail struts being fixedly connected to the module forward end, and said rail strut housings being fixedly connected to the module aft end; or wherein each sliding rail element is in the form of a rail strut telescopically slidable with respect to a rail strut housing between a respective retracted position and a respective extended position, said rail struts being fixedly connected to the module forward end, and said rail strut housings being fixedly connected to the module aft end, and, wherein said retracted position corresponds to the module stowed configuration, and wherein the extended position corresponds to the module deployed configuration.

6. The projectile air intake module according to claim 5, wherein said sliding rail elements comprise spring elements configured for selectively causing the rail struts to be extracted from the respective rail strut housings.

7. The projectile air intake module according to claim 1, further comprising a first locking mechanism having a respective locked configuration in which the projectile air intake module is locked in the module stowed configuration, and a respective unlocked configuration, in which the projectile air intake module can be selectively transitioned from the module stowed configuration to the module deployed configuration.

8. The projectile air intake module according to claim 2, including at least one of the following:

said intake module comprising a rail element locking mechanism, having a respective locked configuration in which the sliding rail elements are locked in the extended positions, corresponding to the module deployed configuration, and a respective unlocked configuration prior to the rail elements attaining the respective extended positions; or wherein in the module deployed configuration, the sliding rail elements in extended configuration provide open lateral portals in-between each laterally adjacent pair of said sliding rail elements, thereby providing free fluid communication between an outside environment of the projectile air intake module and an inside of the module aft end.

9. The projectile air intake module according to claim 4, wherein in the module deployed configuration, the sliding rail elements in extended configuration provide open lateral portals in-between each laterally adjacent pair of said sliding rail elements, thereby providing free fluid communication between an outside environment of the projectile air intake module and an inside of the module aft end, and including at least one of the following:

wherein each said intake cone element is pivotably mounted with respect to the module forward end about a respective cone element pivot axis;

wherein said intake cone elements are configured for pivoting at least partially into and through the open lateral portals in the module deployed configuration; or wherein said intake cone elements are intercalated circumferentially between the sliding rail elements.

10. The projectile air intake module according to claim 1, including one of the following:

wherein each intake cone element has a general triangular plan form, including a base, blunted apex, and lateral edges, and defines an imaginary median line between a mid-point of the respective base and a mid-point of the respective blunted apex; or wherein each intake cone element has a general triangular plan form, including a base, blunted apex, and lateral edges, and defines an imaginary median line between a mid-point of the respective base and a mid-point of the respective blunted apex, and, wherein in said aft facing cone structure adjacent lateral edges of adjacent cone elements are parallel to one another, and wherein the respective blunted apexes of the cone elements are in proximity to one another, together forming an axial opening.

11. The projectile air intake module according to claim 9, wherein each said cone element pivot axis is orthogonal to the central axis and radially displaced therefrom, and wherein each said cone element pivot axis is orthogonal to a radial line projecting from the central axis and intersecting the median line of the respective intake cone element.

12. The projectile air intake module according to claim 1, including one of the following:

wherein the intake cone elements are biased to pivot in direction towards one another; or wherein the intake cone elements are biased to pivot in direction towards one another, and, wherein each intake cone element comprises a biasing element configured for biasing the intake cone elements to pivot in direction towards one another.

13. The projectile air intake module according to claim 1, including one of the following:

wherein the aft facing intake cone arrangement includes a cone element locking arrangement for locking together the intake cone elements in the aft facing cone structure; or wherein the aft facing intake cone arrangement includes a cone element locking arrangement for locking together the intake cone elements in the aft facing cone structure, and, wherein said cone element locking arrangement includes any suitable mechanical lock.

14. The projectile air intake module according to claim 1, further comprising a propulsion system accommodated in said module aft end.

15. The projectile air intake module according to claim 14, including at least one of the following:

said projectile air intake module comprising a service line, said service line coupling the module forward end with the module aft end;

said projectile air intake module comprising a service line, said service line coupling the module forward end with the module aft end, and, wherein said service line provides coupling between an operational interface and at least said propulsion system;

said projectile air intake module comprising a service line, said service line coupling the module forward end with the module aft end, and, wherein said service line comprises a fuel line for supplying liquid fuel to the propulsion system;

said projectile air intake module comprising a service line, said service line coupling the module forward end with the module aft end, and, wherein said service line includes electrical lines for providing electrical power and/or control lines for providing electrical signals and/or electronic signals to the aft module end from the from module end;

said projectile air intake module comprising a service line, said service line coupling the module forward end with the module aft end, and, wherein said module forward end comprises a receptacle, having an aft-facing open end, the receptacle being configured for enabling a portion of the service line to be accommodated therein concurrent with the projectile air intake module being in the module stowed configuration;

said projectile air intake module comprising a service line, said service line coupling the module forward end with the module aft end, and, wherein said module forward end comprises a receptacle, having an aft-facing open end, the receptacle being configured for enabling a portion of the service line to be accommodated therein concurrent with the projectile air intake module being in the module stowed configuration, and, wherein said receptacle is configured for allowing the service line to be extracted from the receptacle, as an aft end of the service line is pulled with the module aft end concurrent with the projectile air intake module being transitioned from the module stowed configuration to the module deployed configuration;

said projectile air intake module comprising a service line, said service line coupling the module forward end with the module aft end, and; or said projectile air intake module comprising a service line, said service line coupling the module forward end with the module aft end, and, wherein in the module deployed configuration, the service line passes from operational interface through the aft facing cone structure and to the propulsion system.

16. The projectile air intake module according to claim 1, including one of the following:

said projectile air intake module comprising a plurality of vanes; or said projectile air intake module comprising a plurality of vanes, and, wherein the vanes are pivotably mounted with respect to the aft module end.

17. A projectile, comprising a projectile forward end, longitudinally coupled to the projectile air intake module as defined in claim 1, and including a propulsion system accommodated in said module aft end.

18. The projectile according to claim 17, including at least one of the following:

wherein the propulsion system comprises at least one turbojet engine; or wherein the projectile has a stowed configuration corresponding to the module stowed confirmation, and a deployed configuration corresponding to the module deployed configuration.

19. A method for deploying a projectile air intake module, the method comprising:

providing the projectile air intake module of claim 1; and longitudinally displacing the module aft end with respect to the module forward end, between the first longitudinal spacing and the second longitudinal spacing.

20. A method for deploying a projectile, comprising:

providing the projectile of claim 17; and longitudinally displacing the module aft end with respect to the module forward end, between the first longitudinal spacing and the second longitudinal spacing, to thereby deploy the projectile from the stowed configuration to the deployed configuration.

* * * * *